May 30, 1967  KO-HSIN LIU  3,323,048
DIELECTRIC MEASURING SYSTEM INCLUDING AN AMPLIFIER
HAVING A NON-AMPLIFYING CATHODE FOLLOWER CIRCUIT
Filed Oct. 21, 1963  3 Sheets-Sheet 1

Inventor
Ko-Hsin Liu
By Anderson, Luedeka, Fitch,
Even & Tabin
Atty's

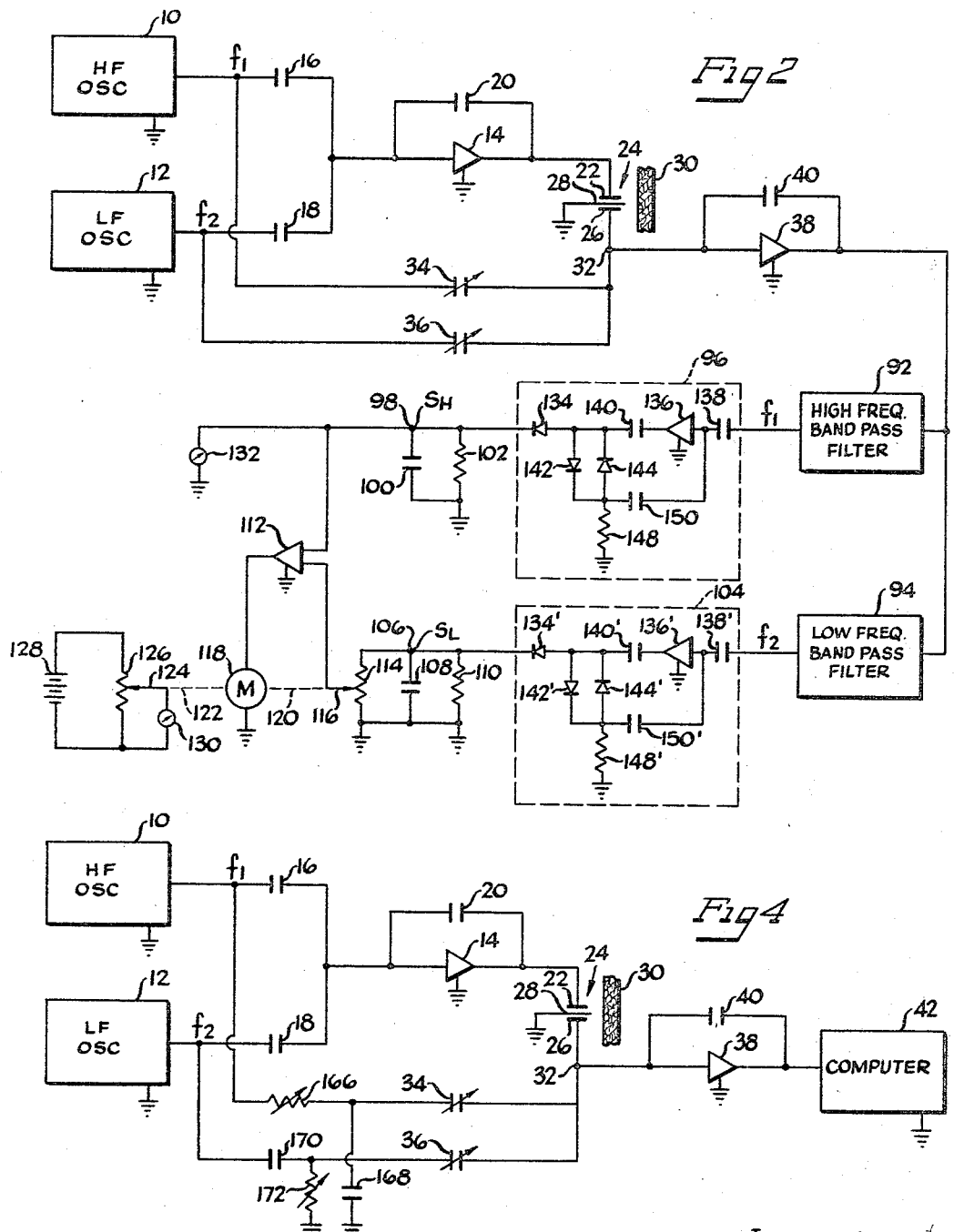

Inventor
Ko-Hsin Liu

United States Patent Office 3,323,048
Patented May 30, 1967

3,323,048
DIELECTRIC MEASURING SYSTEM INCLUDING AN AMPLIFIER HAVING A NON-AMPLIFYING CATHODE FOLLOWER CIRCUIT
Ko-Hsin Liu, Hilliard, Ohio, assignor to Industrial Nucleonics Corporation, a corporation of Ohio
Filed Oct. 21, 1963, Ser. No. 317,533
17 Claims. (Cl. 324—61)

This invention relates generally to a moisture measuring system having a plurality of signals at different frequencies applied to a capacitance probe. This invention is particularly directed to a system for the measurement of moisture in which a capacitance bridge is balanced at two widely separated frequencies one being as high as 530 kilocycles. More particularly, the invention is directed to such a system utilizing an amplifier for phase inversion to provide signals for opposite sides of the bridge, which amplifier is capable of faithful 180° phase inversion with uniform gain over the frequencies utilized. The invention further includes a detector amplifier capable of handling these widely displaced frequencies at a constant gain.

The present invention is an improvement on the system described in the copending application Ser. No. 41,975, filed July 11, 1960, for Measuring System, by Albert F. G. Hanken, now Patent No. 3,155,900, and finds particular application in the systems described in the copending applications Serial No. 181,341 filed Mar. 21, 1962 for Measuring System by Frederick L. Maltby et al.; Ser. No. 268,268 filed Mar. 27, 1963, for Measuring System, by Alan Norwich, now Patent No. 3,290,588; and Ser. No. 317,426 filed Oct. 21, 1963, for Measuring System, by Ko-Hsin Liu.

As is known in the prior art, this system includes a capacitance probe which forms part of a bridge circuit. The proble includes as a dielectric the material of which the moisture is to be measured in an industrial process. This system is particularly adapted for the measurement of moisture in a continuously moving product such as a paper web. The bridge includes balancing capacitance. The bridge is supplied with a pair of signals at separate frequencies. The balancing capacitance balances the bridge at both frequencies in the absence of material in the probe. When material is placed in the probe, the bridge becomes unbalanced at both frequencies. An output signal is developed at each frequency resulting from these input signals as influenced by the material in the probe. The output signals of each frequency are isolated and then applied to a computer that provides an indication of a qualitative or quantitative property of material in the probe.

In order to achieve bridge balance, signals of one phase are applied to the capacitance probe whereas signals of opposite phase are applied to the balancing capacitance. In accordance with the present invention, improved means is provided for developing the signals of opposite phase in order that these signals may be very nearly 180° out of phase at both frequencies and in order that the relative magnitude of the signals remain constant.

The system of the present invention also includes a detector amplifier which amplifies the bridge unbalance signals. This amplifier must also provide a uniform gain over the range of frequencies used.

In certain forms of the present invention additional amplifiers having these same requirements are used.

The frequency utilized depends to some extent upon the particular material to be measured. It has been found desirable to utilize frequencies of 100 kilocycles and 530 kilocycles. On the other hand, it has also been found desirable to operate with frequencies of 10 kilocycles and 100 kilocycles, 1 kilocycle and 10 kilocycles and 100 cycles and 1 kilocycle. In order to accommodate all of these frequencies in a versatile system, the system preferably includes amplifiers having a flat response over the entire range. In particular the present invention includes the use of a wide-band amplifier and a feedback circuit wherein the amplifier untilizes a tube of very high transconductance followed by a cathode follower.

Accordingly, one object of the present invention is to provide a moisture measuring system capable of accurate measurements over a wide range of frequencies.

It is a specific object of the invention to provide a moisture measuring system utilizing single stage wideband amplifiers capable of operating without substantial phase shift or attenuation up to frequencies as high as 530 kilocycles and as low as 100 cycles.

Further objects and features of the present invention will become apparent from a study of the following detailed description, particularly when taken in conjunction with the accompanying drawings in which:

FIGURE 2 is a diagrammatic illustration of a form of the measuring system, showing in greater detail one form of computer and read-out circuit useful in the system of FIGURE 1;

FIGURE 4 is a diagrammatic illustration of a modified form of the invention, including phase shift compensating means;

Figure 1:
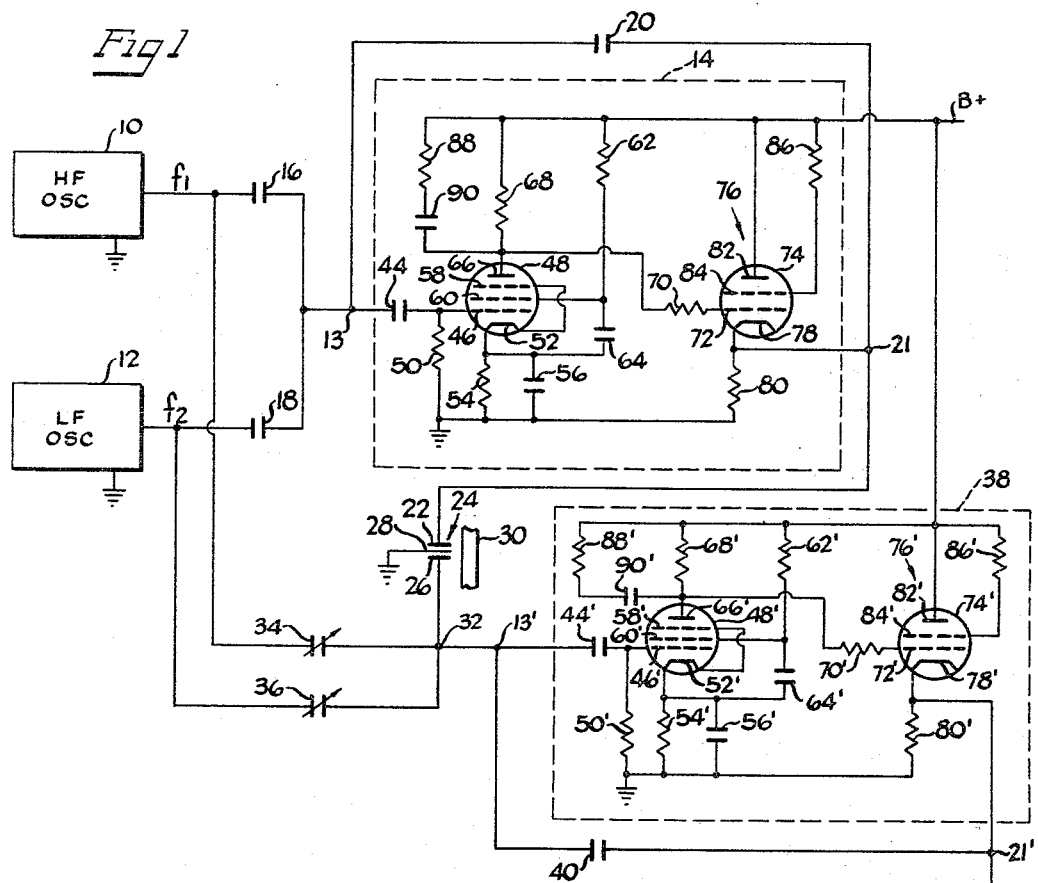
FIGURE 1 is a diagrammatic illustration of one form of the measuring system of the instant invention, showing preferred amplifier circuits.

In FIGURE 1 there is illustrated a simplified form of the system utilizing the present invention. As shown in FIGURE 1 a pair of oscillators 10 and 12 are operative to produce a pair of signals. These two signals are at widely displaced frequencies and are referred to herein as the high and low frequency signals, $f_1$ and $f_2$, respectively. As noted above, the high frequency may be as high as 530 kilocycles and the low frequency as low as 100 cycles. However, the difference in the frequencies is not so great at any one time. The signals are applied to an input terminal 13 of an A.C. feedback amplifier 14 through respective input impedances 16 and 18. The amplifier has feedback applied through an impedance 20. The amplifier 14 is thus connected as a form of A.C. summing amplifier. The impedances 16, 18 and 20 are preferably capacitors. These capacitors may all have the same capacitance although this is not necessary. The structure of the amplifier, its characteristics and its functions will be described in greater detail below. Its purpose is to provide signals at an output terminal 21 which are of the same frequencies as the signals developed by oscillators 10 and 12 but are respectively 180° out of phase therewith. These phase inverted signals are then applied to an electrode 22 of a capacitance probe 24. The probe 24 comprises a fringe field capacitor having an electrode 26 and a grounded guard electrode 28 between electrodes 22 and 26. The material 30 being measured forms a part of the dielectric of the capacitance probe 24. Electrode 26 is connected to a bridge output terminal 32. At the same time, the signals from the high frequency oscillator are applied through a balancing capacitor 34 to the output terminal 32. Likewise, the signals from the low frequency oscillator 12 are simultaneously applied through a balancing capacitor 36 to the output terminal 32. This completes the bridge and bridge excitation circuits. At each of the two frequencies signals of one phase are applied between ground (as a reference datum) and electrode 22 of the capacitance probe 24 and signals of the opposite phase are applied between ground and the respective balancing capacitors 34 and 36, inasmuch as phase reversal is achieved by the A.C. summing amplifier 14.

The output of the bridge circuit is taken between output terminal 32 and ground and is applied to a detector amplifier 38 which has a feedback circuit comprising a capacitor 40. Amplifier 38 therefore also acts as an A.C. summing amplifier and derives at its output the sum of the signals applied through the capacitance probe 24 and the balancing capacitors 34 and 36. Inasmuch as the amplifier 14 effects phase reversal, the signals applied through the probe 24 are out of phase at each frequency with the signals applied through the respective capacitors 34 and 36; this summing is therefore a subtraction. The capacitances of capacitors 34 and 36 are initially adjusted so that, in absence of material in the probe, the sum of the signals is zero, and no output signal is developed at the output of amplifier 38 at either frequency. When material is thereafter introduced into the probe, the unbalance at each frequency appears at the output of amplifier 38. This output may be applied to a computer 42 which may be of the sort disclosed in the aforesaid copending application of Hanken Ser. No. 41,975. The computer functions to derive information as to the property of the material 30 being measured. As disclosed by Hanken, the output circuit 42 may operate to derive separate indications of the moisture content and mass per unit length of the material 30.

The structure, characteristics and functions of the amplifier 38 will also be considered further below. The amplifier 38 may comprise the same circuit as amplifier 14, although the components may have different values. (Corresponding elements are given corresponding primed reference numbers.)

The amplifier 14 (or 38) preferably includes an input capacitor 44 connected to the input terminal 13. This input capacitor is not essential when there is no D.C. applied to the terminal 13, as will be the case when the impedances 16, 18 and 20 are pure capacitance. The signals applied through the input capacitor 44 are applied to the control grid 46 of an amplifier tube 48. The control grid is connected to ground through grid resistor 50. As shown, the amplifier 48 may be a pentode having a cathode 52 connected to ground through the parallel circuit comprising a resistor 54 and a capacitor 56. The suppressor grid 58 of the tube is connected directly to the cathode 52. The screen grid 60 is connected to B+ through a voltage dropping resistor 62 and is connected to the cathode 52 through a capacitor 64. The plate 66 is connected to B+ through a plate load resistor 68.

The output of the tube is taken from the plate and coupled through a resistor 70 to the control grid 72 of a tube 74 connected as a cathode follower circuit 76 which functions as an impedance transformation network and keeps down the output capacitance. It may be considered an impedance matching circuit, although a close impedance match is not essential. Its purpose is to isolate the amplifier and avoid such loading of its as would narrow its bandwidth. The cathode 78 of the tube is connected through a resistor 80 to ground. The plate 82 is connected directly to B+ while the screen grid 84 is connected to B+ through a resistor 86. The resistance of resistor 86 is preferably relatively low and serves to damp parasitic oscillations which are sometimes caused by the distributed inductance and capacitance of the leads. Resistor 70 is also preferably a relatively small resistance serving the same purpose. A resistor 88 and a capacitor 90 may be connected in series across the load resistor 68 to serve as a high frequency stabilizing network, which may be necessary if the cathode follower and/or feedback network introduce high frequency lags.

The important criteria for the amplifiers are that they handle all of the required frequencies without substantial phase shift and all at the same gain. To meet the requirements of the moisture gauge and in order to make certain of the measurements, it is necessary that the amplifier gain response be substantially the same from 100 cycles to 530 kilocycles. The range above about 100 kilocycles permits particularly significant measurements, and it is in just this range where the apparatus of the prior art has proven unsatisfactory. The preferred frequencies are about 100 kilocycles and 530 kilocycles.

In order that the bridge may be balanced with no material at the probe, there must be no substantial phase shift introduced at either frequency except for the 180° introduced by the amplifier stage. Therefore, in the preferred form of the invention, any additional phase shift introduced by the amplifier must be so small as to produce no substantial unbalance signal when the material is absent. In the particular system actually utilized, it has been found that a phase shift of as much as about 0.3° had no substantial effect upon bridge balance. The unbalance was then so small that it was within the accuracy of the computer used. In order to operate up to 530 kilocycles with no substantial phase shift or attenuation at any operating frequency, the amplifier has a frequency response of at least about 100 megacycles. In accordance with the present invention, this is achieved with a single stage of amplification followed by an impedance transformation or matching circuit, e.g., the cathode follower 76, with feedback from the output of the impedance matching circuit to the input of the single stage of amplification.

In accordance with the present invention, it is essential that the amplifier be a single stage amplifier in order that it have a wide frequency response while avoiding high frequency oscillation without the need for complicated compensating networks. The heart of the single stage amplifier is the tube 48 which must have a high transconductance. It should have a figure of merit of at least about 2,000 where the figure of merit, $F_{wa}$, is defined as:

$$F_{wa} = \frac{G_m}{C_{in} + C_o}$$

where $C_{in}$ = input capacitance to the tube in $\mu\mu f$.
$C_o$ = output capacitance of the tube in $\mu\mu f$.
$G_m$ = tube transconductance in $\mu$mhos.

The preferred tubes are frame grid pentodes. In particular, Amperex tube type 7788 has been found satisfactory. A number of tubes are satisfactory for the cathode follower tube 74; however, the use of a tube providing a relatively large amount of power reduces signal attenuation and distortion. Tube type 5881 has been found satisfactory. Satisfactory values for other components have been found to be as follows:

| | | |
|---|---|---|
| Resistor 50 | megohm | 1 |
| Resistor 54 | ohms | 120 |
| Resistor 62 | do | 68,000 |
| Resistor 68 | do | 10,000 |
| Resistor 70 | do | 470 |
| Resistor 80 | do | 4,000 |
| Resistor 86 | do | 47 |
| Resistor 88 | do | 82 |
| Capacitor 44 | $\mu f$ | 0.1 |
| Capacitor 56 | $\mu f$ | 250 |
| Capacitor 64 | $\mu f$ | 4 |
| Capacitor 90 | pf | 15 |

Although some phase shift could be tolerated under some conditions, because it could be compensated for in the circuits of the balancing capacitors, nevertheless, it is desirable that the phase shift of the amplifier be kept very small, otherwise replacement of the tube and aging of the tube and other components might change the amplifier phase shift and leave it no longer compensated for. Where the phase shift is made inherently relatively negligible, a rather large percentage change is still negligible.

The amplifier 38 with its feedback capacitor 40 provides signals indicative of the change in signals occasioned by the presence of the material 30 at the probe 24. It detects these signals while maintaining the terminal 32 essentially at ground potential. This reduces the effect of the large capacitance between the electrodes and ground occasioned principally by the presence of the ground electrode 28.

The computer 42 may take the form shown in more detail in FIGURE 2. If the bridge is balanced so that the output signals at the two frequencies are both at null in the absence of material at the probe, then when the material is placed in operative relationship to the probe, the bridge becomes unbalanced at both frequencies and the unbalance signals appear at the output of the output amplifier 38. The output signals from the amplifier 38 are applied simultaneously to a high frequency band pass filter 92 and a low frequency band pass filter 94. These filters serve to separate the signals at the two frequencies. The band pass filter 92 passes the detection signal at the higher frequency, $f_1$, while band pass filter 94 passes the detection signals at the lower frequency, $f_2$. The detection signal at the higher frequency is then applied to a demodulator 96, which serves to derive a D.C. detection signal at a terminal 98. A capacitor 100 and a resistor 102 may be connected between the terminal 98 and ground, as shown. The D.C. signal ($S_H$) thus derived on terminal 98 is thus a measure of the unbalance of the bridge at the higher frequency.

Similarly, the low frequency detection signal passing band pass filter 94 is applied to a low frequency demodulator 104 which derives a D.C. detection signal ($S_L$) on a terminal 106 which is connected to ground through a capacitor 108 and a resistor 110. The D.C. signal $S_H$ is applied to an input of a servo amplifier 112. The D.C. detection signal $S_L$ is applied to a ratio computing potentiometer 114 having a movable output tap 116 connected to the servo amplifier 112. The output of the servo amplifier 112 is applied to a servo motor 118 which by linkage means 120 (which may be a shaft) operates in a conventional manner to drive the movable tap 116 of the ratio computing potentiometer 114 in such direction as to reduce the input to the servo amplifier 112, i.e., to make the input on tap 116 equal to the input at terminal 98. Thus in a conventional manner the balanced position of the ratio computing potentiometer is systematically related to the ratio of the signal on terminal 106 to the signal on terminal 98, i.e., $S_L/S_H$. This systematic relationship may be direct proportionality. At the same time, the servo motor 118 by means of linkage 122 drives a tap 124 of a moisture read-out potentiometer 126.

A fixed voltage source 128 may be applied between the terminals of the potentiometer 126 and an output signal read on a meter or recorder 130. The output signal indicates the position of tap 124 and hence the position of tap 116 to which it is linked. The position of tap 116 is in turn a measure of the ratio $S_L/S_H$, which is related to the property being measured, e.g., moisture. The potentiometer 126 and meter 130 may be calibrated empirically to read moisture.

On occasion, it is also desirable to monitor the signal on terminal 98 as by a meter 132. This meter may be used in balancing the bridge.

The demodulators 96 and 104 may be identical. An essential element of the demodulator 96 is a diode 134. (Corresponding elements of demodulator 104 are given corresponding primed reference numbers.) In a preferred form of the invention, the single diode is not accurate at low signal levels because it introduces a square function. To return the demodulators to linearity, a square root amplifier is employed. As shown in FIGURE 2, the basic amplifier receives the input from the band pass filter through a coupling capacitor 138. Its output passes through a capacitor 140. Oppositely poled diodes 142 and 144 are connected between the capacitor 140 and a resistor 148 which is connected to ground. These diodes develop a square function which is fed back through a feedback capacitor 150 to the input of the amplifier 136 thus making the amplifier a square root amplifier. The combination of the square root amplifier and the squaring diode 134 results in linearity. The amplifier 136 may be substantially identical with the amplifier 14 illustrated in FIGURE 1.

By the circuit explained more fully in the aforesaid Hanken application, the computer 42 may equally well derive the function $$\frac{S_L - S_H}{S_H}$$

which is equivalent to $(S_L/S_H) - 1$ and is likewise indicative of moisture content.

The present invention is also applicable to systems like that described in the copending application Ser. No. 259,116, filed Feb. 18, 1963, by Clyde W. Baird for Measuring System wherein the ratio $S_L/S_H$ is not directly determined but wherein an equivalent function is derived by modifying the output of the low frequency oscillator to maintain the ratio of detection signals constant, preferably at unity.

Figure 3:
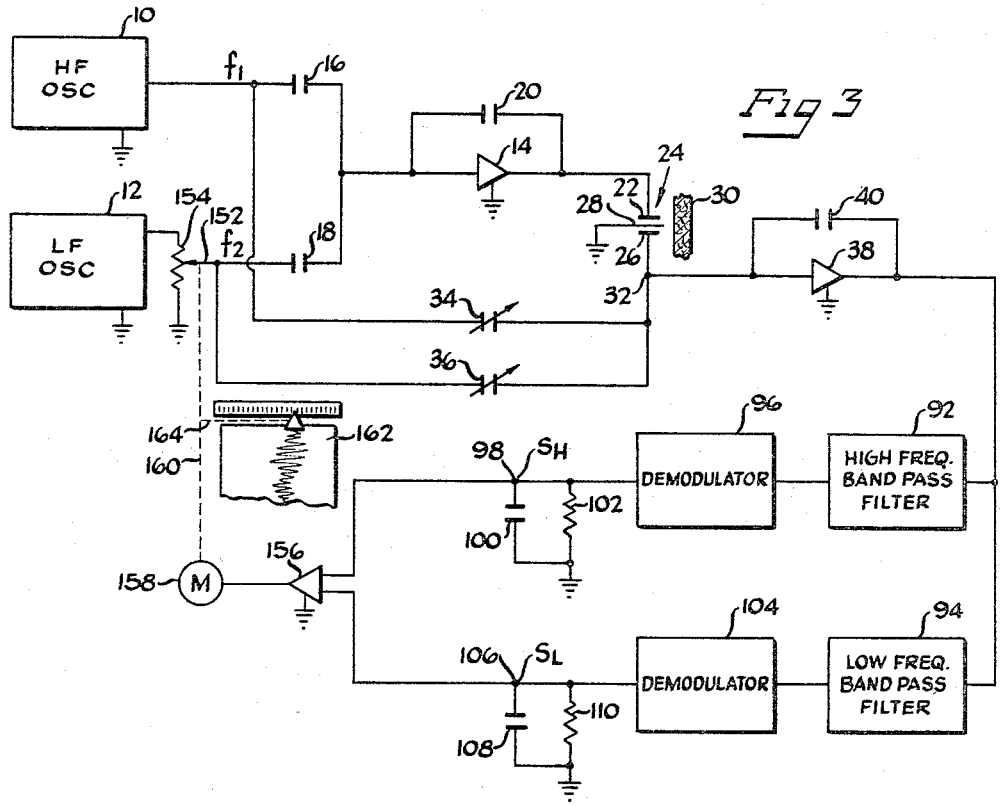
FIGURE 3 is a diagrammatic illustration of the measuring system, showing a modified form of read-out circuit.

As shown in FIGURE 3, the output of the low frequency oscillator 12 is taken from a tap 152 on a potentiometer or voltage divider 154 in order that the magnitude of the signals therefrom can be varied by variation of the potentiometer setting. Except where the context indicates otherwise, the output signals of low frequency oscillator 12 will be considered herein as the signals appearing at tap 152.

The circuit operates like that described above in connection with FIGURE 2, except for the read-out circuit. In the circuit shown in FIGURE 3 the outputs of the demodulators are both applied to a servo amplifier 156, which acts in a conventional manner to produce an output of amplitude and polarity dependent upon the difference between the two D.C. signals, i.e., $S_L - S_H$. The output of amplifier 156 drives a servo motor 158 which mechanically through linking means 160 (which may be a shaft) moves the tap 152 to vary the output of the low frequency oscillator 12. Depending upon whether the signal $S_L$ is less than or greater than the signal $S_H$, the polarity of the output of servo amplifier 156 is such as to cause the motor 158 to rotate so as to move the tap 152 up or down, respectively, thus increasing or decreasing the output of low frequency oscillator 12 as necessary to reduce the difference between the two D.C. signals. So long as the two signals are different, the tap is moved. When the two signals are equal, the servo system is balanced, and the tap 152 is at that point on the slidewire that provides the appropriate amplitude of the output of the low frequency oscillator to produce this balance. The position of the tap is indicative of this output and is likewise indicative of moisture, as will now be shown.

As in the case of the system shown in FIGURE 2, this ratio of $S_L$ to $S_H$ is indicative of the moisture content of the material being measured. In the system of FIGURE 2, the outputs of the two oscillators were preferably of equal amplitude. Were the output of the low frequency oscillator to be doubled, the ratio of $S_L$ to $S_H$ would be doubled. Hence, if the moisture content of the material were to change so as to cause the ratio of $S_L$ to $S_H$ to change from unity to two, the output of oscillator 12 could be reduced by a factor of two to return the ratio to unity. This is automatically done by the system of FIGURE 3, and the position of the tap 152 is related to the reciprocal of the ratio of $S_L$ to $S_H$ that would have existed had the oscillators had the same output, as in the system of FIGURE 2. A read-out device 162 may be coupled to the tap 152 by linkage means 164 so as to read out the tap position and hence moisture content. The particular relationship between tap position and the read-out scale is determined by the particular manner in which the potentiometer 152 is wound. The system can thus be calibrated empirically to read-out moisture content directly.

There may be inherent phase shifts in a circuit built in accordance with FIGURES 1, 2 or 3 which will prevent the adjustment of a perfect null balance. When the imperfection is so great as to have an appreciable effect upon the results, this undesirable phase shift can be compensated for by phase correction networks such as those shown in FIGURE 4. As shown in FIGURE 4 the phase shift correction at the high frequency may comprise an RC network such as series resistor 166 and shunt capacitor 168. Similarly, the lower frequency phase shift can be compensated for by an RC circuit such as that comprising series capacitance 170 and shunt resistance 172. In both cases, the phase adjustment can be made empirically while observing the output signals from amplifier 38 at the respective frequencies with no material in the probe.

Although signals from the oscillators 10 and 12 are applied both to the phase inverting amplifier 14 and the balancing capacitors 34 and 36. Signals of the same amplitude are not required as balance depends also upon the relative magnitudes of the various impedances 16, 18 and 20 and the magnitudes of the capacitors 34 and 36. Thus, the signals from the oscillators may be coupled through voltage dividers.

Figure 5:
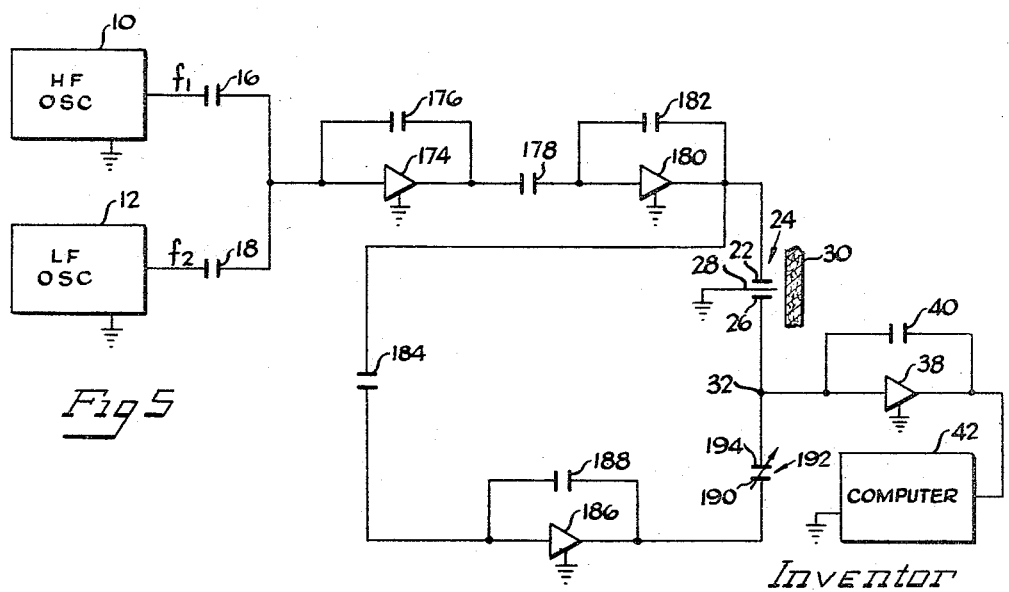
FIGURE 5 is a diagrammatic illustration of a modified form of the invention, showing modified bridge and bridge excitation circuits.

As may be evident from the above description of the operation of the amplifier 14 in the system illustrated in FIGURE 1, the amplifier 14 serves three separate functions, the function of combining the pair of signals from oscillators 10 and 12 at their respective frequencies, the function of inverting the phase of the signals and the function of applying the pair of inverted signals to the bridge. These functions may be performed by three separate amplifiers each similar to the amplifier 14. The system illustrated in FIGURE 5 may then be used under the circumstances where it is desirable that these functions be performed separately, the functions being performed by amplifiers 174, 180 and 186, respectively. As shown in FIGURE 5, an amplifier 174 with a feedback impedance 176 is connected to the impedances 16 and 18 to receive the signals from the oscillators 10 and 12. The amplifier 174 therefore supplies at its output the combined signals at the two frequencies. This output is applied through an impedance 178 to an amplifier 180 having a feedback impedance 182. This amplifier develops the signals at the appropriate signal levels to apply to the plate 22 of the capacitance probe 24. At the same time, the signals applied to the plate 22 are applied through an impedance 184 to an amplifier 186 having a feedback impedance 188. The amplifier 186 serves to invert the signals. These inverted signals are then applied to a plate 190 of a capacitor 192, the other plate 194 of the capacitor being connected to the terminal 32. In this case, the capacitor 192 is the balancing capacitor replacing capacitors 34 and 36 of the system of FIGURE 1. As shown, the impedances 176, 178, 182, 184 and 188 are preferably capacitors.

Thus, in the system of FIGURE 5, the amplifier 174 combines the signals of the two frequencies; the amplifier 180 provides excitation signals for the probe 24; and the amplifier 186 inverts the signals applied to the probe to provide bridge balancing signals on the capacitor 192 which is adjusted so that the bridge is balanced at both frequencies in absence of material 30 at the probe 24. The introduction of material 30 into the probe then unbalances the bridge providing unbalanced signals related to moisture content. These unbalanced signals are applied through the detector amplifier 38 to the computer 42 where the information relating to moisture content is extracted by comparison of the signals detected at the respective frequencies.

It is also within the scope of this invention to combine the functions of amplifiers 174 and 180 in one single stage amplifier.

Although certain specific embodiments have been described herein, modifications may be made thereto without departing from the true spirit and scope of the invention as set forth in the appended claims. For example, it should be noted that although the probe is called a capacitance probe, the quantity measured includes both the pure capacitance and the resistance of the material measured. The probe electrodes are not ordinarily insulated from the material being measured. The invention also has applicability to a system where the frequency rather than the amplitude of the low frequency oscillator is varied to maintain the ratio $S_L/S_H$ constant, and that frequency is measured as an indication of moisture content.

The present invention is also applicable to systems utilizing other computers or read-out circuits. For example, under certain conditions the ratio $S_L/S_H$ is a double-valued function of moisture. This occurs at the higher moisture contents. To avoid this double-valued function, it has been known to modify the indication, as by limiting the value of the signal $S_H$. The present invention may be used with such read-out circuits.

Figure 6:
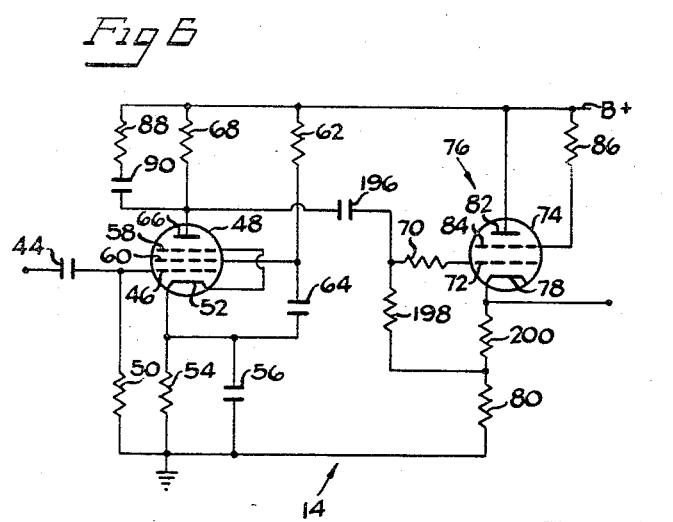
FIGURE 6 is a diagrammatic illustration of a modified form of amplifier useful in the systems illustrated in FIGURES 1 to 5.

It should also be noted that the amplifiers may be modified within the scope of this invention. For example, where it is not necessary to go to frequencies as low as 100 cycles, it is preferable that the cathode follower 76 not be directly coupled to the amplifier stage. As shown in FIGURE 6, a capacitor 196 may be interposed. The circuit is also modified to include resistors 198 and 200 to provide the appropriate bias on grid 72.

Although the system described herein can be used at lower frequencies, in the range above about 100 kilocycles, it offers unique advantages over the systems of the prior art.

It should be noted that although some might consider a cathode follower circuit to comprise an amplifying stage, it does not amplify the input voltage nor change its phase. Within the terminology used herein, the cathode follower is not an amplifier and the amplifiers include but a single amplifying stage comprising pentode 48.

What is claimed is:

1. In a system for determining the moisture content of a dielectric material including: a measuring probe having first and second spaced electrodes for coupling said probe to said material; balancing impedance means connected to said second electrode; means for applying a first pair of signals each at a respective one of two substantially different frequencies to said first electrode whereby said first pair of signals are coupled to said second electrode through said measuring probe, one of said frequencies being of the order of at least 100 kilocycles; means for applying a second pair of signals to said balancing impedance means so as to couple said second pair of signals to said second electrode through said balancing impedance means to balance said first pair of signals passing through said measuring probe so that there is no net signal developed at said second electrode at either of said frequencies in the absence of material at said probe, each of said second pair of signals being at a respective one of said two frequencies and substantially 180° out of phase with a respective one of said first pair of signals; and output means connected to said second electrode for measuring a function of the signals developed thereat at both of said frequencies with said material at said probe as an indication of said moisture content, the improvement wherein at least one of said signal applying and output means comprises at least one amplifier including a single stage of amplification, an impedance matching circuit providing substantially no phase shift between its input and output at either of said frequencies and with its input coupled to the output of said single stage of amplification, and a feedback impedance coupled between the output of said impedance matching circuit and the input of said single stage of amplification, said amplifier amplifying signals at both of said frequencies at substantially the same gain and producing at both frequencies substantially the same phase shift between its input and output.

2. In a system for determining the moisture content of a dielectric material including: a measuring probe having first and second spaced electrodes for coupling said probe to said material; balancing impedance means connected to said second electrode; means for applying a first pair of signals each at a respective one of two substantially different frequencies to said first electrode whereby said first pair of signals are coupled to said second electrode through said measuring probe, one of said frequencies being of the order of at least 100 kilocycles and the other of said frequencies being of the order of at least 500 kilocycles; means for applying a second pair of signals to said balancing impedance means so as to couple said second pair of signals to said second electrode through said balancing impedance means to balance said first pair of signals passing through said measuring probe so that there is no net signal developed at said second electrode at either of said frequencies in the absence of material at said probe, each of said second pair of signals being at a respective one of said two frequencies and substantially 180° out of phase with a respective one of said first pair of signals; and output means connected to said second electrode for measuring a function of the signals developed thereat at both of said frequencies with said material at said probe as an indication of said moisture content, the improvement wherein at least one of said signal applying and output means comprises at least one amplifier including a single stage of amplification, a cathode follower circuit with its input coupled to the output of said single stage of amplification, and a feedback impedance coupled between the output of said cathode follower circuit and the input of said single stage of amplification, said amplifier amplifying signals at both of said frequencies at substantially the same gain and producing at both frequencies substantially the same phase shift between its input and output.

3. In a system for determining the moisture content of a dielectric material including: a measuring probe having first and second spaced electrodes for coupling said probe to said material; balancing impedance means connected to said second electrode; means for applying a first pair of signals each at a respective one of two substantially different frequencies to said first electrode whereby said first pair of signals are coupled to said second electrode through said measuring probe, one of said frequencies being of the order of at least 100 kilocycles; means for applying a second pair of signals to said balancing impedance means so as to couple said second pair of signals to said second electrode through said balancing impedance means to balance said first pair of signals passing through said measuring probe so that there is no net signal developed at said second electrode at either of said frequencies in the absence of material at said probe, each of said second pair of signals being at a respective one of said two frequencies and substantially 180° out of phase with a respective one of said first pair of signals; and output means connected to said second electrode for measuring a function of the signals developed thereat at both of said frequencies with said material at said probe as an indication of said moisture content, the improvement wherein at least one of said signal applying and output means comprises at least one amplifier including a single stage of amplification, an impedance matching circuit providing substantially no phase shift between its input and output at either of said frequencies and with its input coupled to the output of said single stage of amplification, and a feedback impedance coupled between the output of said impedance matching circuit and the input of said single stage of amplification, said amplifier amplifying signals at both of said frequencies at substantially the same gain and producing at both frequencies phase shift between its input and output of 179.7° to 180.3°.

4. In a system for determining the moisture content of a dielectric material including: a measuring probe having first and second spaced electrodes for coupling said probe to said material; balancing impedance means connected to said second electrode; means for applying a first pair of signals each at a respective one of two substantially different frequencies to said first electrode whereby said first pair of signals are coupled to said second electrode through said measuring probe, one of said frequencies being of the order of at least 100 kilocycles and the other of said frequencies being of the order of at least 500 kilocycles; means for applying a second pair of signals to said balancing impedance means so as to couple said second pair of signals to said second electrode through said balancing impedance means to balance said first pair of signals passing through said measuring probe so that there is no net signal developed at said second electrode at either of said frequencies in the absence of material at said probe, each of said second pair of signals being at a respective one of said two frequencies and substantially 180° out of phase with a respective one of said first pair of signals; and output means connected to said second electrode for measuring a function of the signals developed thereat at both of said frequencies with said material at said probe as an indication of said moisture content, the improvement wherein at least one of said signal applying and output means comprises at least one amplifier including a single stage of amplification, a cathode follower circuit with its input coupled to the output of said single stage of amplification, and a feedback impedance coupled between the output of said cathode follower circuit and the input of said single stage of amplification, said amplifier amplifying signals at both of said frequencies at substantially the same gain and producing at both frequencies phase shift between its input and output of 179.7° to 180.3°.

5. In a system for determining the moisture content of a dielectric material including: a measuring probe having first and second spaced electrodes for coupling said probe to said material; balancing impedance means connected to said second electrode; means for applying a first pair of signals each at a respective one of two substantially different frequencies to said first electrode whereby said first pair of signals are coupled to said second electrode through said measuring probe; means for applying a second pair of signals to said balancing impedance means so as to couple said second pair of signals to said second electrode through said balancing impedance means to balance said first pair of signals passing through said measuring probe so that there is no net signal developed at said second electrode at either of said frequencies in the absence of material at said probe, each of said second pair of signals being at a respective one of said two frequencies and substantially 180° out of phase with a respective one of said first pair of signals; and output means connected to said second electrode for measuring a function of the signals developed thereat at both of said frequencies with said material at said probe as an indication of said moisture content, the improvement wherein at least one of said signal applying and output means comprises at least one amplifier including a single stage of amplification, an impedance matching circuit providing substantially no phase shift at either of said frequencies and having its input coupled to the output of said single stage of amplification, and a feedback impedance coupled between the output of said impedance matching circuit and the input of said single stage of amplification, said amplifier having a frequency response of the order of at least 100 megacycles.

6. In a system for determining the moisture content of a dielectric material including: a measuring probe having first and second spaced electrodes for coupling said probe to said material; balancing impedance means connected to said second electrode; means for applying a first pair of signals each at a respective one of two substantially different frequencies to said first electrode whereby said first pair of signals are coupled to said second electrode through said measuring probe; means for applying a secon dpair of signals to said balancing impedance means so as to couple said second pair of signals to said second electrode through said balancing impedance means to balance said first pair of signals passing through said measuring probe so that there is no net signal developed at said second electrode at either of said frequencies in the absence of material at said probe, each of said second pair of signals being at a respective one of said two frequencies and substantially 180° out of phase with a respective one of said first pair of signals; and output means connected to said second electrode for measuring a function of the signals developed thereat at both of said frequencies with said material at said probe as an indication of said moisture content, the improvement wherein at least one of said signal applying and output means comprises at least one amplifier having a single stage of amplification including a pentode of high transconductance, a cathode follower circuit with its input coupled to the output of said single stage of amplification, and a feedback impedance coupled between the output of said cathode follower circuit and the input of said single stage of amplification, said amplifier having a frequency response of the order of at least 100 megacycles.

7. In a system for determining the moisture content of a dielectric material including: a measuring probe having first and second spaced electrodes for coupling said probe to said material, balancing impedance means connected to said second electrode, means for applying a first pair of signals each at a respective one of two substantially different frequencies to said first electrode whereby said first pair of signals are coupled to said second electrode through said measuring probe; means for applying a second pair of signals to said balancing impedance means so as to couple said second pair of signals to said second electrode through said balancing impedance means to balance said first pair of signals passing through said measuring probe so that there is no net signal developed at said second electrode at either of said frequencies in the absence of material at said probe, each of said second pair of signals being at a respective one of said two frequencies and substantially 180° out of phase with respective ones of said first pair of signals, and output means connected to said second electrode for measuring a function of the signals developed thereat at both of said frequencies with said material at said probe as an indication of said moisture content, the improvement wherein at least one of said signal applying and output means comprises an amplifier for amplifying signals at both of said frequencies at substantially the same gain and producing at both frequencies substantially 180° phase shift between its input and output, said amplifier comprising a single stage of amplification including a frame-grid pentode, a cathode follower circuit with its input coupled to the output of said single stage of amplification, and a feedback impedance coupled between the output of said cathode follower circuit and the input of said single stage of amplification, said amplifier having a frequency response of the order of at least 100 megacycles.

8. In a system for determining the moisture content of a dielectric material including: a measuring probe having first and second spaced electrodes for coupling said probe to said material, balancing impedance means connected to said second electrode, means for applying a first pair of signals each at a respective one of two substantially different frequencies to said first electrode whereby said first pair of signals are coupled to said second electrode through said measuring probe, one of said frequencies being of the order of at least 100 kilocycles, means for applying a second pair of signals to said balancing impedance means so as to couple said second pair of signals to said second electrode through said balancing impedance means to balance said first pair of signals passing through said measuring probe so that there is no net signal developed at said second electrode at either of said frequencies in the absence of material at said probe, each of said second pair of signals being at a respective one of said two frequencies and substantially 180° out of phase with respective ones of said first pair of signals, and output means connected to said second electrode for measuring a function of the signals developed thereat at both of said frequencies with said material at said probe as an indication of said moisture content, the improvement wherein at least one of said signal applying and output means comprises an amplifier for amplifying signals at both of said frequencies at substantially the same gain and producing at both frequencies substantially 180° phase shift between its input and output, said amplifier comprising a single stage of amplification including a frame-grid pentode, a cathode follower circuit with its input coupled to the output of said single stage of amplification, and a feedback impedance coupled between the output of said cathode follower circuit and the input of said single stage of amplification.

9. In a system for determining the moisture content of a dielectric material including: a measuring probe having first and second spaced electrodes for coupling said probe to said material, balancing impedance means connected to said second electrode, means for applying a first pair of signals each at a respective one of two substantially different frequencies to said first electrode whereby said first pair of signals are coupled to said second electrode through said measuring probe, one of said frequencies being of the order of at least 100 kilocycles, means for applying a second pair of signals to said balancing impedance means so as to couple said second pair of signals to said second electrode through said balancing impedance means to balance said first pair of signals passing through said measuring probe so that there is no net signal developed at said second electrode at either of said frequencies in the absence of material at said probe, each of said second pair of signals being at a respective one of said two frequencies and substantially 180° out of phase with respective ones of said first pair of signals, and output means connected to said second electrode for measuring a function of the signals developed thereat at both of said frequencies with said material at said probe as an indication of said moisture content, the improvement wherein at least one of said signal applying and output means comprises an amplifier for amplifying signals at both of said frequencies at substantially the same gain and producing at both frequencies substantially 180° phase shift between its input and output, said amplifier comprising a single stage of amplification including a pentode having a figure of merit of at least about 2000 where said figure of merit $F_{wa}$ is defined by the equation:

$$F_{wa} = \frac{G_m}{C_{in} + C_o}$$

in which $G_m$ is the pentode transconductance in $\mu$mhos,
$C_{in}$ is the input capacitance of the pentode in $\mu\mu$f., and
$C_o$ is the output capacitance of the pentode in $\mu\mu$f.

an impedance matching circuit providing substantially no phase shift at either of said frequencies and having its input coupled to the output of said single stage of amplification, and a feedback impedance coupled between the output of said impedance matching circuit and the input of said single stage of amplification.

10. A system for determining the moisture content of a dielectric material comprising: a measuring probe having first and second spaced electrodes for coupling said probe to said material; balancing impedance means connected to said second electrode; means for applying a first pair of signals each at a respective one of two substantially different frequencies to said first electrode whereby said first pair of signals are coupled to said second electrode through said measuring probe, one of said frequencies being of the order of at least 100 kilocycles; a phase inverting amplifier for developing a second pair of signals from said first pair of signals, each of said second pair of signals being at a respective one of said two frequencies and substantially 180° out of phase with a respective one of said first pair of signals; means for applying said second pair of signals to said second electrode through said balancing impedance means to balance said first pair of signals passing through said measuring probe so that there is no net signal developed at said second electrode at either of said frequencies in the absence of material at said probe; an amplifier connected to said second electrode for summing the signals passing through said measuring probe and the signals passing through said impedance means; and output means connected to the output of said amplifier for measuring a function of the signals developed thereat at both of said frequencies with said material at said probe as an indication of said moisture content, at least one of said amplifiers comprising a single stage of amplification including a vacuum tube having a figure of merit of the order of at least 2000 where the figure of merit $F_{wa}$ is defined by the equation:

$$F_{wa} = \frac{G_m}{C_{in} + C_o}$$

in which, $G_m$ is tube transconductance in $\mu$mhos,
$C_{in}$ is input capacitance of the tube in $\mu\mu f.$, and
$C_o$ is output capacitance of the tube in $\mu\mu f.$, the control grid of said tube being coupled to said second electrode, an impedance matching circuit providing substantially no phase shift at either of said frequencies and having its input coupled to the output of said single stage of amplification, and a feedback impedance coupled between the output of said impedance matching circuit and said control grid.

11. A system for determining the moisture content of a dielectric material comprising: a measuring probe having first and second spaced electrodes for coupling said probe to said material; balancing impedance means connected to said second electrode; means for applying a first pair of signals each at a respective one of two substantially different frequencies to said first electrode whereby said first pair of signals are coupled to said second electrode through said measuring probe, one of said frequencies being of the order of at least 100 kilocycles; a phase inverting amplifier for developing a second pair of signals from said first pair of signals, each of said second pair of signals being at a respective one of said two frequencies and substantially 180° out of phase with a respective one of said first pair of signals; means for applying said second pair of signals to said second electrode through said balancing impedance means to balance said first pair of signals passing through said measuring probe so that there is no net signal developed at said second electrode at either of said frequencies in the absence of material at said probe; an amplifier connected to said second electrode for summing the signals passing through said measuring probe and the signals passing through said impedance means; and output means connected to the output of said amplifier for measuring a function of the signals developed thereat at both of said frequencies with said material at said probe as an indication of said moisture content, at least one of said amplifiers comprising a single stage of amplification, a cathode follower circuit with its input coupled to the output of said single stage of amplification, and a feedback impedance coupled between the output of said impedance matching circuit and said control grid, said amplifier having a frequency response of the order of at least 100 megacycles.

12. A system for determining the moisture content of a dielectric material comprising: a measuring probe having first and second spaced electrodes for coupling said probe to said material; balancing impedance means connected to said second electrode; means for applying a first pair of signals each at a respective one of two substantially different frequencies to said first electrode whereby said first pair of signals are coupled to said second electrode through said measuring probe; means for applying a second pair of signals to said second electrode through said balancing impedance means to balance said first pair of signals passing through said measuring probe so that there is no net signal developed at said second electrode at either of said frequencies in the absence of material at said probe, each of said second pair of signals being at a respective one of said two frequencies and substantially 180° out of phase with a respective one of said first pair of signals; an amplifier connected to said second electrode for summing the signals passing through said measuring probe and the signals passing through said impedance means, said amplifier having a single stage of amplification including a pentode of high transconductance, the control grid of said pentode being coupled to said second electrode, a cathode follower circuit with its input coupled to the output of said single stage of amplification, and a feedback impedance coupled between the output of said cathode follower circuit and said control grid of said pentode; and output means connected to the output of said impedance matching circuit for measuring a function of the signals developed thereat at both of said frequencies with said material at said probe as an indication of said moisture content.

13. A system for determining the moisture content of a dielectric material comprising: a measuring probe having first and second spaced electrodes for coupling said probe to said material; balancing impedance means connected to said second electrode; means for applying a first pair of signals each at a respective one of two substantially different frequencies to said first electrode whereby said first pair of signals are coupled to said second electrode through said measuring probe, one of said frequencies being of the order of at least 100 kilocycles; means for applying a second pair of signals to said second electrode through said balancing impedance means to balance said first pair of signals passing through said measuring probe so that there is no net signal developed at said second electrode at either of said frequencies in the absence of material at said probe, each of said second pair of signals being at a respective one of said two frequencies and substantially 180° out of phase with a respective one of said first pair of signals; an amplifier connected to said second electrode for amplifying signals passing through said measuring probe and the signals passing through said impedance means at both of said frequencies at substantially the same gain and producing at both of said frequencies substantially 180° phase shift between its input and output, said amplifier having a single stage of amplification including a frame-grid pentode, the control grid of said pentode being coupled to said second electrode, a cathode follower circuit with its input coupled to the output of said single stage of amplification, and a feedback impedance coupled between the output of said cathode follower circuit and said control grid of said pentode; and output means connected to the output of said impedance matching circuit for measuring a function of the signals developed thereat at both of said frequencies with said material at said probe as an indication of said moisture content.

14. A system for determining the moisture content of a dielectric material comprising: a measuring probe having first and second spaced electrodes for coupling said probe to said material; balancing impedance means connected to said second electrode; means for applying a first pair of signals each at a respective one of two substantially different frequencies to said first electrode whereby said first pair of signals are coupled to said second electrode through said measuring probe, one of said frequencies being of the order of at least 100 kilocycles; means for applying a second pair of signals to said second electrode through said balancing impedance means to balance said first pair of signals passing through said measuring probe so that there is no net signal developed at said second electrode at either of said frequencies in the absence of material at said probe, each of said second pair of signals being at a respective one of said two frequencies and substantially 180° out of phase with a respective one of said first pair of signals; an amplifier connected to said second electrode for amplifying signals passing through said measuring probe and the signals passing through said impedance means at both of said frequencies at substantially the same gain and producing at both of said frequencies substantially 180° phase shift between its input and output, said amplifier having a single stage of amplification, a cathode follower circuit with its input coupled to the output of said single stage of amplification, and a feedback impedance coupled between the output of said cathode follower circuit and the input of said single stage of amplification, said amplifier amplifying signals at both of said frequencies at substantially the same gain and producing at each frequency a phase shift between its input and output of substantially 180°; and output means connected to the output of said impedance matching circuit for measuring a function of the signals developed thereat at both of said frequencies with said material at said probe as an indication of said moisture content.

15. In a system for determining the moisture content of a dielectric material including: a measuring probe having first and second spaced electrodes for coupling said probe to said material, balancing impedance means connected to said second electrode, means for applying a first pair of signals each at a respective one of two substantially different frequencies to said first electrode whereby said first pair of signals are coupled to said second electrode through said measuring probe, one of said frequencies being of the order of at least 100 kilocycles, means for applying a second pair of signals to said second electrode through said balancing impedance means to balance said first pair of signals passing through said measuring probe so that there is no net signal developed at said second electrode at either of said frequencies in the absence of material at said probe, each of said second pair of signals being at a respective one of said two frequencies and substantially 180° out of phase with respective ones of said first pair of signals, and output means connected to said second electrode for measuring a function of the signals developed thereat at both of said frequencies with said material at said probe as an indication of said moisture content, the improvement which comprises an amplifier included in said output means and connected to said second electrode, said amplifier comprising a single stage of amplification, a cathode follower circuit with its input coupled to the output of said single stage of amplification, and a feedback impedance coupled between the output of said cathode follower circuit and the input of said single stage of amplification, said amplifier amplifying signals at both of said frequencies at substantially the same gain and producing at each frequency a phase shift between its input and output of 179.7° to 180.3°.

16. In a system for determining the moisture content of a dielectric material including: a measuring probe having first and second spaced electrodes for coupling said probe to said material, balancing impedance means connected to said second electrode, means for applying a first pair of signals each at a respective one of two substantially different frequencies to said first electrode whereby said first pair of signals are coupled to said second electrode through said measuring probe, one of said frequencies being of the order of at least 100 kilocycles, means for applying a second pair of signals to said second electrode through said balancing impedance means to balance said first pair of signals passing through said measuring probe so that there is no net signal developed at said second electrode at either of said frequencies in the absence of material at said probe, each of said second pair of signals being at a respective one of said two frequencies and substantially 180° out of phase with respective ones of said first pair of signals, and output means connected to said second electrode for measuring a function of the signals developed thereat at both of said frequencies with said material at said probe as an indication of said moisture content, the improvement which comprises a phase inverting amplifier for developing one of said first and second pairs of signals from the other of said first and second pairs of signals, said amplifier comprising a single stage of amplification, a cathode follower circuit with its input coupled to the output of said single stage of amplification, and a feedback impedance coupled between the output of said cathode follower circuit and the input of said single stage of amplification, said amplifier amplifying signals at both of said frequencies at substantially the same gain and producing at each frequency a phase shift between its input and output of 179.7° to 180.3°.

17. In a system for determining the moisture content of a dielectric material including: a measuring probe having first and second spaced electrodes for coupling said probe to said material, balancing impedance means connected to said second electrode, means for applying a first pair of signals each at a respective one of two substantially different frequencies to said first electrode whereby said first pair of signals are coupled to said second electrode through said measuring probe, means for applying a second pair of signals to said second electrode through said balancing impedance means to balance said first pair of signals passing through said measuring probe so that there is no net signal developed at said second electrode at either of said frequencies in the absence of material at said probe, each of said second pair of signals being at a respective one of said two frequencies and substantially 180° out of phase with a respective one of said first pair of signals, and output means connected to said second electrode for measuring a function of the signals developed thereat at both of said frequencies with said material at said probe as an indication of said moisture content, the improvement which comprises a phase inverting amplifier for developing one of said first and second pairs of signals from the other of said first and second pairs of signals, said amplifier comprising a single stage of amplification including a pentode of high transconductance, the control grid of said pentode being coupled to receive said other of said first and second pairs of signals, a cathode follower circuit with its input coupled to the output of said single stage of amplification, and a feedback impedance coupled between the output of said cathode follower circuit and said control grid of said pentode.

References Cited
UNITED STATES PATENTS 3,241,062   3/1966   Baird _____ 324—61
3,290,588   12/1966  Norwich _____ 324—61

WALTER L. CARLSON, *Primary Examiner.*

EDWARD E. KUBASIEWICZ, *Examiner.*